United States Patent
Neil et al.

(10) Patent No.: US 9,374,380 B2
(45) Date of Patent: Jun. 21, 2016

(54) NON-HARMFUL INSERTION OF DATA MIMICKING COMPUTER NETWORK ATTACKS

(71) Applicant: Los Alamos National Security, LLC, Los Alamos, NM (US)

(72) Inventors: Joshua Charles Neil, Jemez Springs, NM (US); Alexander Kent, Los Alamos, NM (US); Curtis Lee Hash, Jr., Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 96 days.

(21) Appl. No.: 13/826,736

(22) Filed: Mar. 14, 2013

(65) Prior Publication Data

US 2013/0254895 A1    Sep. 26, 2013

Related U.S. Application Data

(60) Provisional application No. 61/614,148, filed on Mar. 22, 2012.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |

(Continued)

(52) U.S. Cl.
CPC ............ *H04L 63/1408* (2013.01); *H04L 1/002* (2013.01); *H04L 63/1425* (2013.01); *H04L 63/1433* (2013.01); *G06F 21/577* (2013.01); *H04L 2463/144* (2013.01)

(58) Field of Classification Search
CPC ............. H04L 63/1416; H04L 63/145; H04L 63/1425; H04L 63/1408; H04L 63/14; G06F 21/577; G06F 21/554; G06F 21/55; G06F 21/552

See application file for complete search history.

(56) References Cited

U.S. PATENT DOCUMENTS

| | | | |
|---|---|---|---|
| 6,671,811 B1 | 12/2003 | Diep et al. | |
| 7,346,803 B2 | 3/2008 | Ide et al. | |

(Continued)

FOREIGN PATENT DOCUMENTS

| | | | |
|---|---|---|---|
| EP | 2056559 A1 * | 5/2009 | |
| WO | 2013014672 A1 | 1/2013 | |

OTHER PUBLICATIONS

"Anomaly Detection in Large Graphs," Akoglu et al., CMU-CS-09-173 Technical Report, School of Computer Science of Carnegie Mellon University, Pittsburgh, http://citeseerx.ist.psu.edu/viewdoc/summary?doi=10.1.1.188.2619 (Nov. 2009).

(Continued)

*Primary Examiner* — Amir Mehrmanesh
*Assistant Examiner* — Quy Pham
(74) *Attorney, Agent, or Firm* — LeonardPatel PC

(57) ABSTRACT

Non-harmful data mimicking computer network attacks may be inserted in a computer network. Anomalous real network connections may be generated between a plurality of computing systems in the network. Data mimicking an attack may also be generated. The generated data may be transmitted between the plurality of computing systems using the real network connections and measured to determine whether an attack is detected.

19 Claims, 7 Drawing Sheets

(51) Int. Cl.
　　　H04L 1/00　　　(2006.01)
　　　G06F 21/57　　　(2013.01)

(56) References Cited

U.S. PATENT DOCUMENTS

| | | | |
|---|---|---|---|
| 7,603,711 | B2 | 10/2009 | Scheidell |
| 7,627,900 | B1 | 12/2009 | Noel et al. |
| 8,386,377 | B1 | 2/2013 | Xiong et al. |
| 8,397,298 | B2 | 3/2013 | Macwan et al. |
| 8,448,247 | B2 | 5/2013 | Stute |
| 8,588,764 | B1 | 11/2013 | Koller et al. |
| 8,627,473 | B2 | 1/2014 | Coskun et al. |
| 8,650,630 | B2 | 2/2014 | Choyi et al. |
| 2002/0019870 | A1 | 2/2002 | Chirashnya et al. |
| 2002/0178383 | A1* | 11/2002 | Hrabik et al. .......... 713/201 |
| 2003/0105976 | A1 | 6/2003 | Copeland |
| 2004/0122803 | A1 | 6/2004 | Dom et al. |
| 2004/0133672 | A1 | 7/2004 | Bhattacharya et al. |
| 2005/0044406 | A1 | 2/2005 | Stute |
| 2005/0203881 | A1 | 9/2005 | Sakamoto et al. |
| 2006/0053136 | A1 | 3/2006 | Ashiri |
| 2006/0253906 | A1* | 11/2006 | Rubin et al. .......... 726/23 |
| 2007/0209074 | A1 | 9/2007 | Coffman |
| 2007/0226796 | A1 | 9/2007 | Gilbert et al. |
| 2007/0240207 | A1 | 10/2007 | Belakhdar et al. |
| 2008/0281771 | A1 | 11/2008 | Lai et al. |
| 2009/0024549 | A1 | 1/2009 | Johnson |
| 2009/0320137 | A1* | 12/2009 | White et al. .......... 726/25 |
| 2010/0192226 | A1 | 7/2010 | Noel et al. |
| 2011/0141915 | A1 | 6/2011 | Choi et al. |
| 2011/0154119 | A1 | 6/2011 | Wang et al. |
| 2011/0231937 | A1 | 9/2011 | Lippmann et al. |
| 2012/0317644 | A1 | 12/2012 | Kumar et al. |
| 2013/0117849 | A1* | 5/2013 | Golshan et al. .......... 726/23 |
| 2013/0127618 | A1* | 5/2013 | Sheleheda et al. ........ 340/540 |
| 2013/0318615 | A1 | 11/2013 | Christodorescu et al. |
| 2014/0041028 | A1 | 2/2014 | Ramsey et al. |
| 2014/0165207 | A1 | 6/2014 | Engel et al. |

OTHER PUBLICATIONS

"Graph Based Statistical Analysis of Network Traffic," Djidjev et al., Proceedings of the Ninth Workshop on Mining and Learning with Graphs, http://csr.lanl.gov/detection/ (Aug. 2011).

"Scan Statistics for the Online Discovery of Locally Anomalous Subgraphs," PhD Dissertation by Joshua Charles Neil, University of New Mexico, http://repository.unm.edu/handle/1928/13885 (May 2011).

"The Link-Prediction Problem for Social Networks," David Liben-Nowell, Jon Kleinberg, Journal of the American Society for Information Science and Technology, 58(7), pp. 1019-1031 (May 2007).

International Search Report issued in PCT Application No. PCT/US13/31402 on Nov. 22, 2013.

International Search Report issued in PCT Application No. PCT/US13/31463 on Jan. 13, 2014.

"Bayesian Anomaly Detection Methods for Social Networks," Nicholas A. Heard, David J. Watson, Kiriaki Platanioti, and David J. Hand, Institute of Mathematical Statistics, The Annals of Applied Statistics, vol. 4, No. 2, pp. 645-662 (2010).

"Graph-Based Anomaly Detection in Computer Network Data," Joshua Neil, SIAM Annual Meeting, Denver, Colorado (Jul. 6-10, 2009).

"GraphScan: Scan Statistics for the Detection of Anomalous Paths in a Graph," Joshua Neil, Curtis Storlie, Curtis Hash, Alexander Brugh, and Michael Fisk, 2010 Joint Statistical Meetings, Vancouver, Canada (Aug. 4, 2010).

"PathScan: Finding the Attacker Within," Joshua Neil, DHS Transition to Practice Demo Day, Washington, DC (Jan. 9, 2013).

"Scan Statistics for the Online Discovery of Anomalous Subgraphs," Joshua Neil, PhD Dissertation Defense at the University of New Mexico (May 3, 2011).

"Scan Statistics on Enron Graphs," Carey E. Priebe, John M. Conroy, David J. Marchette, and Youngser Park, Workshop on Link Analysis, Counterterrorism and Security at the SIAM International Conference on Data Mining, Newport Beach, CA (Apr. 23, 2005).

"The Science of Cyber Security LDRD Day 2012 Poster," Joshua Neil, LDRD Day 2012, Pojaque, New Mexico (Oct. 23, 2012).

"A Survey of Coordinated Attacks and Collaborative Intrusion Detection," C.V. Zhou, C. Leckie, and S. Karunasekera, Computers & Security,29(1), pp. 124-140 (2010).

"Alert Correlation in a Cooperative Intrusion Detection Framework," F. Cuppens and A. Miege, Proceedings of the 2002 IEEE Symposium on Security and Privacy, pp. 202-215 (2002).

"BotMiner: Clustering Analysis of Network Traffic for Protocol- and Structure-Independent Botnet Detection," Guofei Gu, Roberto Perdisci, Junjie Zhang, and Wenke Lee, Proceedings of the 17th Conference on Security Symposium, SS'08, pp. 139-154, Berkeley, CA (2008).

"Botnets: A Survey," S.S.C. Silva, R.M.P. Silva, R.C.G. Pinto, and R.M. Salles, Computer Networking, http://dx.doi.org/10.1016/j.comnet.2012.07.021 (2012).

"GrIDS—A Graph Based Intrusion Detection System for Large Networks," S. Staniford-Chen, S. Cheung, R. Crawford, M. Dilger, J. Frank, J. Hoagland, K. Levitt, C. Wee, R. Yip, and D. Zerkle, Proceedings of the 19th National Information Systems Security Conference, vol. 1, pp. 361-370, Baltimore, MD (1996).

"Identifying Botnets by Capturing Group Activities in DNS Traffic," Hyunsang Choi and Heejo Lee, Computer Networks, 56(1), pp. 20-33, http://dx.doi.org/10.1016/j.comnet.2011.07.018 (Jan. 2012).

"Probabilistic Alert Correlation," A. Valdes and K. Skinner, Recent Advances in Intrusion Detection, vol. 2212, Lecture Notes in ComputerScience, pp. 54-68, Springer Berlin Heidelberg (2001).

"Scan Statistics for the Online Detection of Locally Anomalous Subgraphs," Joshua Neil, Curtis Storlie, Curtis Hash, Alexander Brugh, Michael Fisk, Advanced Computing Solutions, Statistical Sciences Group (CCS-6), Los Alamos National Laboratory, www.stat.lanl.gov/staff/CurtStorlie/pathscan.pdf (Mar. 26, 2012).

Nirav B. Patel, Non-Final Office Action issued on Jun. 19, 2014 for U.S. Appl. No. 13/826,995.

Extended European Search Report for EP Appln. Serial No. 13800730.7 issued on Nov. 24, 2015.

Hristo Djidjev et al., "Graph Based Statistical Analysis of Network Traffic," Technometrics, XP055162179 (Aug. 1, 2011).

Joshua Neil et al., "Scan Statistics for the Online Detection of Locally Anomalous Subgraphs," Technometrics, vol. 55, No. 4, pp. 403-414 (Nov. 1, 2013).

Extended European Search Report issued in corresponding European Appln. Serial No. 13800081.5 on Jan. 15, 2016.

Khreich et al., "Adaptive ROC-based Ensembles of HMMs Applied to Anomaly Detection," Pattern Recognition, vol. 45, pp. 208-230, XP28388706A (2012).

Nirav B. Patel, Non-Final Office Action, issued on Feb. 4, 2016 for U.S. Appl. No. 14/609,836.

Zachary A. Davis, Non-Final Office Action issued on Feb. 16, 2016 for U.S. Appl. No. 14/383,024.

Canadian Office Action issued in Appln. Serial No. CA 2,868,054 (corresponds with U.S. Appl. No. 14/382,992) on Oct. 14, 2015.

Joshua Neil et al., "Scan Statistics for the Online Detection of Locally Anomalous Subgraphs," Technometrics, vol. 55, No. 4, pp. 403-414, XP055162176 (Nov. 1, 2013).

Muhammad Qasim Ali et al., "Two-Tier Data-Driven Intrusion Detection for Automatic Generation Control in Smart Grid," IEEE Conference on Communication and Network Security, IEEE, pp. 292-300, XP032714730 (Oct. 29, 2014).

Nirav B. Patel, Non-Final Office Action issued on Oct. 7, 2015 for U.S. Appl. No. 14/609,836.

Partial Supplementary European Search Report issued in Appln. Serial No. 13800081.5 (corresponds with U.S. Appl. No. 14/382,992) on Nov. 2, 2015.

Wael Khreich et al., "Adaptive ROC-Based Ensembles of HMMs Applied to Anomaly Detection," Pattern Recognition, vol. 45, No. 1, pp. 208-230, XP28388706 (Jan. 2012).

(56) References Cited

OTHER PUBLICATIONS

Du et al.; Discovering Collaborative Cyber Attack Patterns Using Social Network Analysis; Mar. 2011; Retrieved from the Internet <URL: link.springer.com/chapter/10.1007/978-3-642-19656-0_20#page-1>; pp. 1-8 as printed.

Iliofotou et al.; Exploiting dynamicity in Graph-based Traffic Analysis: Techniques and Applications; Dec. 2009; Retrieved from the Internet <URL: dl.acm.org/citation.cfm?id=1658967>; pp. 1-12 as printed.

Michael W. Chao, Non-Final Office Action, issued on Sep. 1, 2015 for U.S. Appl. No. 14/383,024.

Final Office Action issued in U.S. Appl. No. 13/826,995 on Oct. 3, 2014.

Nirav B. Patel, Notice of Allowance issued on Nov. 3, 2014 for U.S. Appl. No. 13/826,995.

* cited by examiner

100

300

NON-HARMFUL INSERTION OF DATA MIMICKING COMPUTER NETWORK ATTACKS

CROSS REFERENCE TO RELATED APPLICATIONS

This application claims the benefit of U.S. Provisional Application Ser. No. 61/614,148, filed on Mar. 22, 2012. The subject matter of this earlier filed provisional patent application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to mimicking network attacks, and, more particularly, to non-harmful insertion of data mimicking computer network attacks.

BACKGROUND

Conventional approaches to anomaly detection may use validation data in two forms. First, researchers have used real attack data to attempt to validate their approaches. This may be the best approach when such data is available, but typically, network operators have very little or no real attack data for their networks. Real attacks tend to be very rare. If such data is available, the generation of attack data may allow researchers to vary the parameters of the generation scheme and to test their methods on a variety of attacks. As such, researchers can usually only make substantiated claims about the specific attacks for which they have data.

Second, researchers have simulated both non-attack data and attack data. Many of these simulations are generated from models whose parameters are estimated from real networks. This has the advantage of allowing flexibility in the distributions of both nominal and attack data, which allows researchers to test methods against a variety of different scenarios. This method, however, suffers from the assumptions of the models generating the data. In short, researchers are not using real data, and many differences exist between real data and simulated data. Accordingly, an improved method to simulate attacks may be beneficial.

SUMMARY

Certain embodiments of the present invention may provide solutions to the problems and needs in the art that have not yet been fully identified, appreciated, or solved by current attack mimicking technologies. For example, some embodiments of the present invention insert non-harmful data that mimics computer network attacks.

In one embodiment, a computer-implemented method includes generating, by a plurality of computing systems, anomalous real network connections between the plurality of computing systems in a network. The computer-implemented method also includes generating, by the plurality of computing systems, data mimicking an attack. The computer-implemented method further includes transmitting, by the plurality of computing systems, the generated data between the plurality of computing systems using the real network connections.

In another embodiment, a computer program is embodied on a non-transitory computer-readable medium. The computer program is configured to cause at least one processor to determine, based on historical data, which network connections to generate between a plurality of computing systems to create an anomaly. The computer program is also configured to cause the at least one processor to generate the network connections to create the anomaly and verify that a data collection mechanism for the network actually measured data pertaining to the connections. The computer program is further configured to cause the at least one processor to provide output of results indicating success or failure of each of the previous steps.

In yet another embodiment, a computer-implemented method includes inserting, by a plurality of computing systems, traffic in a path in a network including computing systems that do not normally communicate. The computer-implemented method also includes detecting the inserted path, by a computing system, as anomalous.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

Some embodiments of the present invention automatically create network data from within a deployed network for the purposes of validation and data collection. The type of data that is created may mimic that of an attacker acting maliciously on the network. Additionally, some embodiments may provide the opportunity to validate anomaly detection methods on the data.

In real anomaly detection implementations, it was recognized that users were not using the PathScan™ anomaly detection tool correctly on their data. Users were not measuring their network data well, even though they thought they were. In addition, since real attacks are very rare, it is beneficial to be able to convince customers that anomalies can be detected. By creating non-harmful data that mimics attacks, both goals can be accomplished. In other words, users can be trained to use anomaly detection tools correctly, and customers can be shown that anomalies can be detected.

In order to introduce data that realistically mimics an attack into a network data stream, a couple of validations should be made with respect to the generation code. First, it should be validated that the network operator is collecting data of sufficient quality to be used for anomaly detection. To this end, the validation code should check that the data inserted by the data generation code is indeed measured by the network collection mechanism. While this may sound trivial, it is the case that even at large, well-funded networks, this validation may not currently be performed, and some embodiments having such features present a significant advance in the art of network data collection. Second, it should be validated that the applied approach detects the type of attack introduced by the code.

Some embodiments of the present invention use real network data in generating the mimicked attacks. However, the data in some embodiments is not attack data from real events, which are rare and cannot be controlled. Rather, the data is obtained by generating real network connections in an anomalous way between computers controlled by network security personnel who monitor the network. What may constitute an anomalous way is described in more detail, for example, in priority U.S. Provisional Patent Application Ser. No. 61/614,148.

The underlying mechanism by which the data is generated can vary, but it is generally important for the insertion process to be non-harmful to the network. One example is generating Domain Name Server ("DNS") traffic using nslookup in a path consisting of machines that have never communicated before. nslookups are benign queries that resolve an Internet Protocol ("IP") address from a given host name.

Figure 1:
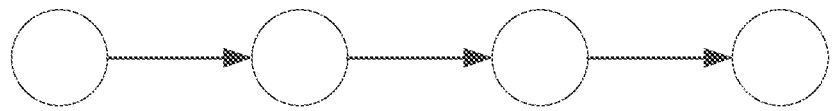
FIG. 1 illustrates an inserted path as a series of hops, according to an embodiment of the present invention.
Figure 2:
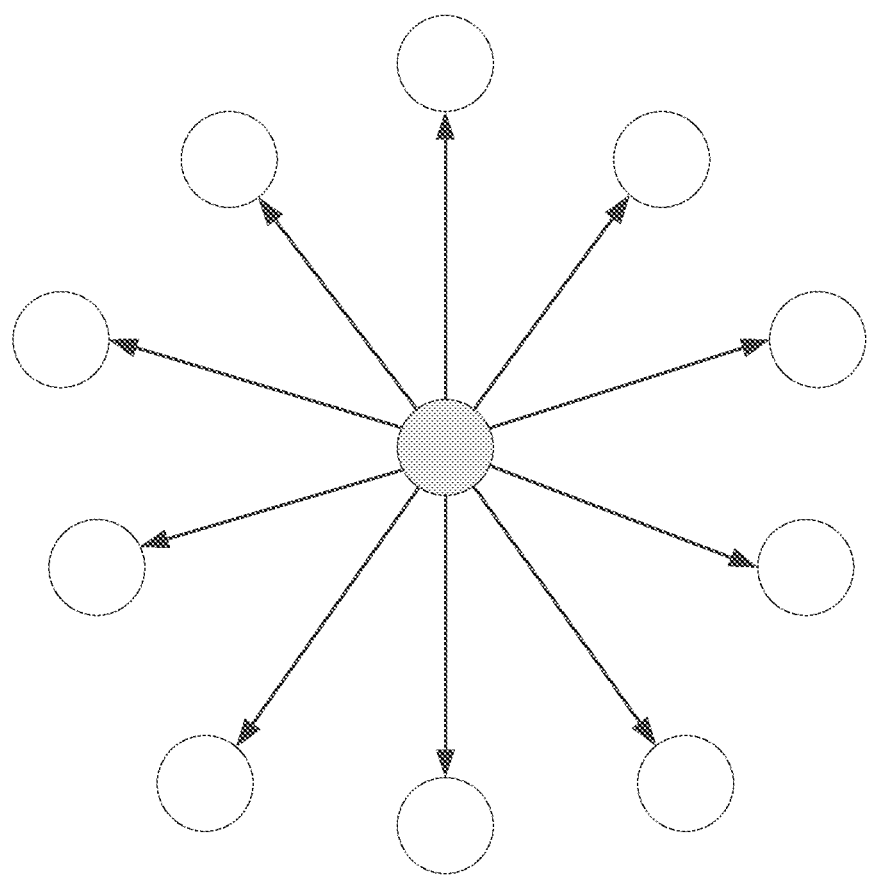
FIG. 2 illustrates an outstar inserted into a network, according to an embodiment of the present invention.

An inserted path may mimic the behavior of a malicious actor in the network, traversing from one host to the next in a sequence of hops. This is illustrated, for example, in path 100 of FIG. 1, where the fictitious "malicious actor" traverses across four hosts from left to right. Another example would be the insertion of an anomalous outstar, a shape which is created by a malicious actor using a central machine to examine and/or compromise its direct neighbors in the network. This is depicted, for example, in outstar 200 of FIG. 2. The gray host is compromised by the "malicious actor", and the white hosts are direct neighbors that the gray host seeks to examine and/or compromise. Again, it is emphasized that the nslookup approach merely mimics the behavior of a malicious actor, without causing any hosts to actually be compromised.

Figure 3:
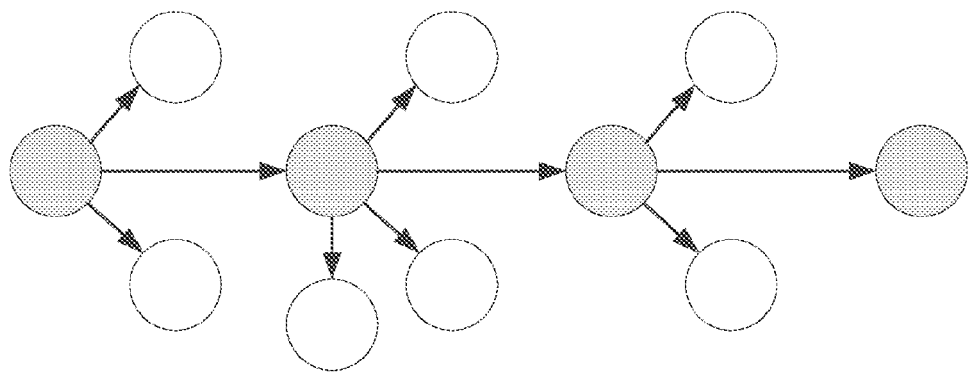
FIG. 3 illustrates a caterpillar inserted into a network, according to an embodiment of the present invention.

A third example is that of a caterpillar, a shape which is created when a malicious actor creates a combination of outstars while traversing through a path. This is shown, for example, in caterpillar 300 of FIG. 3. The gray hosts and the edges between them are part of the core path. The white nodes and edges are part of outstars for respective gray nodes. nslookup is a network administration tool for querying DNS to obtain domain name or IP address mapping, or for any other specific DNS record. However, this is only a single example. One of ordinary skill in the art will understand based on the present disclosure that other non-harmful data generation mechanisms may be used, and the shape of the attack in the network may be configurable.

Figure 4:
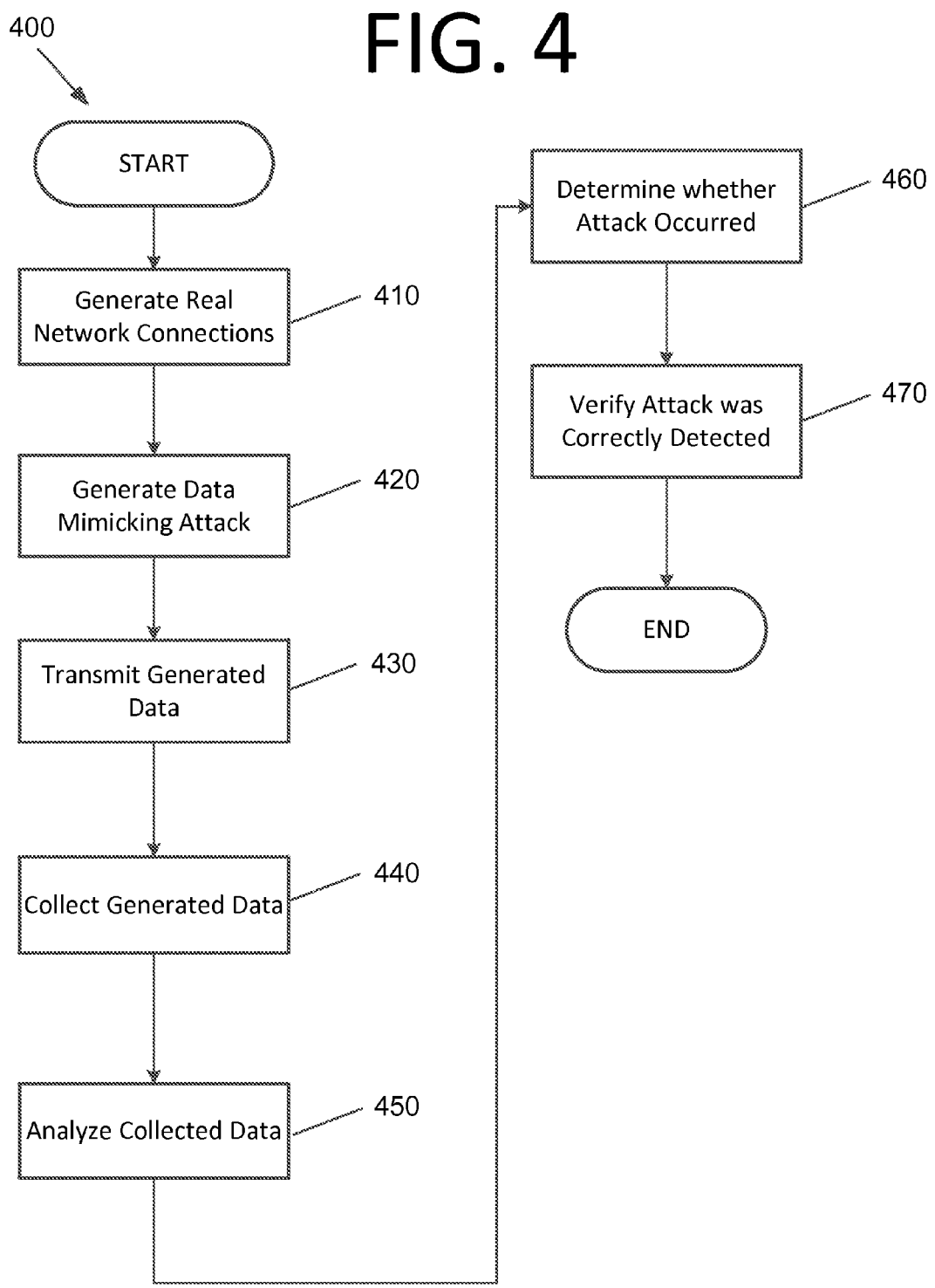
FIG. 4 is a flowchart of a method for generating non-harmful data mimicking a network attack and detecting the attack, according to an embodiment of the present invention.

FIG. 4 is a flowchart 400 of a method for generating non-harmful data mimicking a network attack and detecting the attack, according to an embodiment of the present invention. In some embodiments, the method may be performed, for example, by computing systems such as computing system 700 of FIG. 7. The method begins with generating real network connections in an anomalous way between a plurality of computers in a network at 410. Next, data mimicking an attack is generated and sent between the plurality of computers using the real network connections at 420. For example, the generated data may be DNS traffic using nslookup in a path consisting of computers that have never communicated before. The generated data is then transmitted between the plurality of computers using the real network connections at 430.

A computer collects the generated data mimicking the attack at 440, and the collected data is analyzed at 450. The computer then determines whether an attack has occurred based on the collected data at 460. At 470, the computer verifies that the attack was correctly detected.

In some embodiments, software creating data mimicking attacks may require accounts on multiple networked computers. The software may also require data pertaining to historical connection patterns between the networked computers so that anomalous behavior may be effectively detected. An embodiment with this functionality is discussed with respect to FIG. 5 below.

Figure 5:
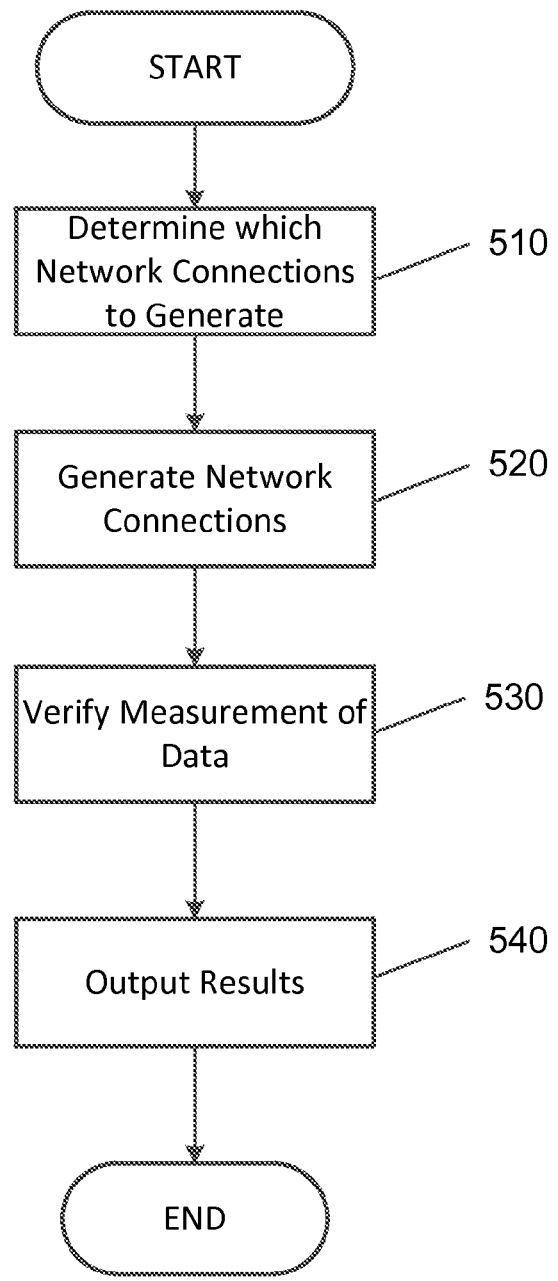
FIG. 5 is a flowchart of another method for generating non-harmful data mimicking a network attack and detecting the attack, according to an embodiment of the present invention.

FIG. 5 is a flowchart 500 of a method for generating non-harmful data mimicking a network attack and detecting the attack, according to an embodiment of the present invention. In some embodiments, the method may be performed, for example, by computing systems such as computing system 700 of FIG. 7. The method begins with determining, based on historical data, which network connections to generate between a plurality of computing systems to create an anomaly at 510. The network connections to insert the anomaly are then generated at 520. Next, a computing system configured to monitor for anomalies verifies that the data collection mechanism for the network actually measured the data pertaining to the connections at 530. Data collection mechanisms may include, but are not limited to, collection of DNS data, collection of NetFlow data, other centralized logging mechanisms, and host-based collection, such as via a Unified Host Collection Agent ("UHCA"). Output results are then provided at 540 indicating success or failure of each of the previous steps.

Figure 6:
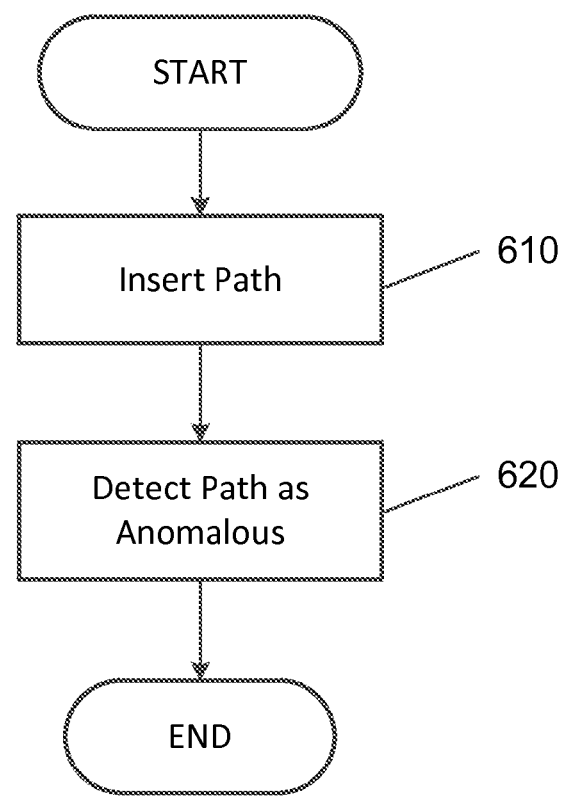
FIG. 6 is a flowchart of yet another method for generating non-harmful data mimicking a network attack and detecting the attack, according to an embodiment of the present invention.

FIG. 6 flowchart 600 of a method for generating non-harmful data mimicking a network attack and detecting the attack, according to an embodiment of the present invention. In some embodiments, the method may be performed, for example, by computing systems such as computing system 700 of FIG. 7. The method begins with inserting traffic in a path in a network including computing systems that do not normally communicate at 610. The inserted path is then detected as anomalous at 620.

Figure 7:
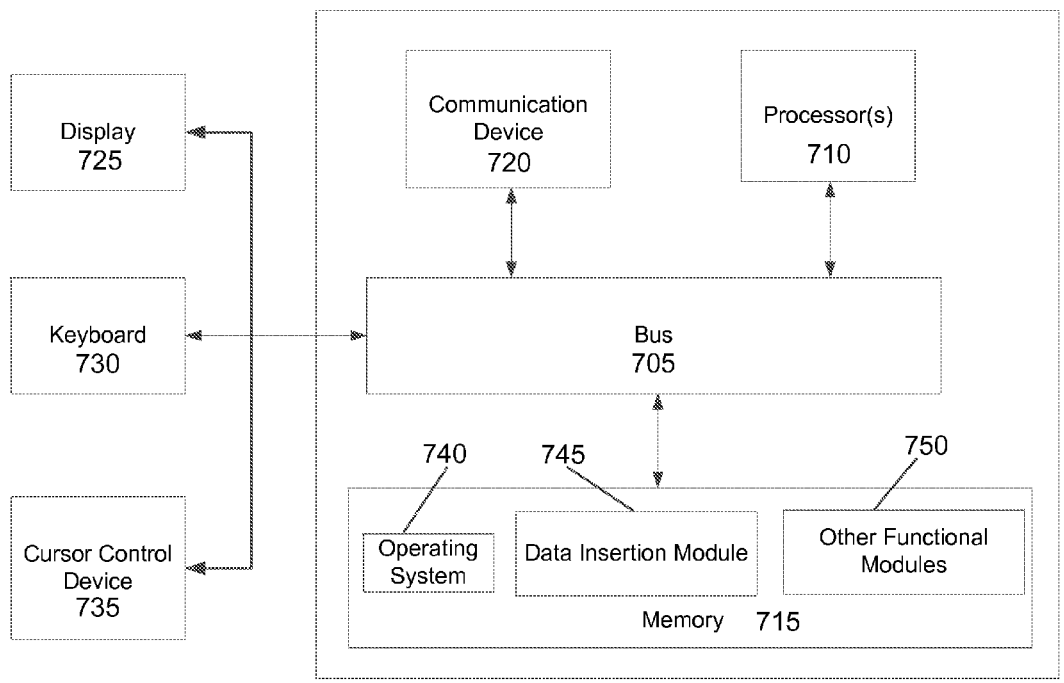
FIG. 7 is a block diagram of a computing system for detecting group attacks on a network, according to an embodiment of the present invention.

FIG. 7 is a block diagram of a computing system 700 for inserting non-harmful data mimicking an attack into a network, according to an embodiment of the present invention. Computing system 700 includes a bus 705 or other communication mechanism for communicating information, and processor(s) 710 coupled to bus 705 for processing information. Processor(s) 710 may be any type of general or specific purpose processor, including a central processing unit ("CPU") or application specific integrated circuit ("ASIC"). Processor(s) 710 may also have multiple processing cores, and at least some of the cores may be configured to perform specific functions. Computing system 700 further includes a memory 715 for storing information and instructions to be executed by processor(s) 710. Memory 715 can be comprised of any combination of random access memory ("RAM"), read only memory ("ROM"), flash memory, cache, static storage such as a magnetic or optical disk, or any other types of non-transitory computer-readable media or combinations thereof. Additionally, computing system 700 includes a communication device 720, such as a transceiver, to wirelessly provide access to a communications network.

Non-transitory computer-readable media may be any available media that can be accessed by processor(s) 710 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 710 are further coupled via bus 705 to a display 725, such as a Liquid Crystal Display ("LCD"), for displaying information to a user. A keyboard 730 and a cursor control device 735, such as a computer mouse, are further coupled to bus 705 to enable a user to interface with computing system 700. However, in certain embodiments such as those for mobile computing implementations, a physical keyboard and mouse may not be present, and the user may interact with the device solely through display 725 and/or a touchpad (not shown). Any type and combination of input devices may be used as a matter of design choice.

In one embodiment, memory 715 stores software modules that provide functionality when executed by processor(s) 710. The modules include an operating system 740 for computing system 700. The modules further include a data insertion module 745 that is configured to insert non-harmful data mimicking an attack using one or more embodiments of the present invention. Computing system 700 may include one or more additional functional modules 750 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIGS. 4-6 may be performed by a computer program, encoding instructions for the nonlinear adaptive processor to perform at least the methods described in FIGS. 4-6, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 4-6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
determining based on historical data, by a computing system, which anomalous real network connections to generate between a plurality of computing systems in a network to create the anomalous real network connections based on stochastic models, the anomalous real network connections forming a k-path between the plurality of computing systems comprising a plurality of directed edges, each directed edge comprising associated data;
generating, by the plurality of computing systems, the determined anomalous real network connections between the plurality of computing systems in the network;
building stochastic models, by the computing system, for each directed edge in the k-paths of each of the anomalous network connections;
comparing historical parameters with current parameters in a time window, by the computing system, to determine a level of anomalousness of each of the k-paths;
generating, by the plurality of computing systems, data mimicking an attack; and
transmitting, by the plurality of computing systems, the generated data between the plurality of computing systems using the determined anomalous real network connections forming respective k-paths.

2. The computer-implemented method of claim 1, wherein the data mimicking the attack is designed to mimic one or more specific types of attacks based on known types of real attacks.

3. The computer-implemented method of claim 1, wherein the generated data comprises Domain Name Server ("DNS") traffic that is transmitted in a path comprising computing systems that are not in communication with one another.

4. The computer-implemented method of claim 1, wherein the generated data comprises traffic in the form of an outstar or a caterpillar.

5. The computer-implemented method of claim 1, wherein the historical data comprises historical connection patterns between the plurality of computing systems.

6. The computer-implemented method of claim 1, further comprising:
collecting, by a computing system, the generated data mimicking the attack;
analyzing, by the computing system, the collected data;
determining, by the computing system, whether an attack has occurred based on the collected data; and
verifying, by the computing system, that the attack was correctly detected.

7. The computer-implemented method of claim 6, further comprising:
providing output of results, by the computing system, indicating effectiveness of the verification.

8. A computer program embodied on a non-transitory computer-readable medium, the computer program configured to cause at least one processor to:
determine, based on historical data, which network connections to generate that form a k-path between a plurality of computing systems to create an anomaly by applying stochastic models for each edge in the k-path;
build a stochastic model for each directed edge in the k-path;
compare historical parameters with current parameters in a time window to determine a level of anomalousness of the k-path;
generate the determined network connections in the k-path to create the anomaly;
verify that a data collection mechanism for the network actually measured data pertaining to the generated connections; and
provide output of results indicating a degree of success or failure of the verification.

9. The computer program of claim 8, wherein the network anomaly is designed to mimic one or more specific types of attacks based on known types of real attacks.

10. The computer program of claim 8, wherein the program is further configured to cause the at least one processor to:
generate data mimicking an attack, wherein
the generated data comprises Domain Name Server ("DNS") traffic that is transmitted in a path comprising computing systems that are not in communication with one another.

11. The computer program of claim 8, wherein the anomaly comprises traffic in the form of an outstar or a caterpillar.

12. The computer program of claim 8, the program further configured to cause the at least one processor to determine, based on historical data, which anomalous real network connections to generate between the plurality of computing systems to create the anomaly.

13. The computer program of claim 12, wherein the historical data comprises historical connection patterns between the plurality of computing systems.

14. A computer-implemented method, comprising:
building a stochastic model, by a computing system, for each edge in a k-path of anomalous network connections;
comparing historical parameters with current parameters in a time window, by the computing system, to determine a level of anomalousness of the k-path;
inserting, by a plurality of computing systems, traffic in the k-path in a network comprising computing systems that do not normally communicate, the traffic deviating from the stochastic model for each edge of the k-path;
detecting the inserted k-path, by the computing system, as anomalous based on analysis of the inserted traffic;
verifying, by the computing system, that an attack was correctly detected based on the detected inserted k-path; and
providing output of results, by the computing system, indicating a degree of success or failure of the verification, wherein the k-path comprises a plurality of directed edges, each directed edge comprising associated data.

15. The computer-implemented method of claim 14, wherein the inserted traffic is designed to mimic one or more specific types of attacks based on known types of real attacks.

16. The computer-implemented method of claim 14, wherein the inserted traffic comprises Domain Name Server ("DNS") traffic that is transmitted in a path comprising computing systems that are not in communication with one another.

17. The computer-implemented method of claim 14, wherein the inserted traffic comprises traffic in the form of an outstar or a caterpillar.

18. The computer-implemented method of claim 14, further comprising:
    determining based on historical data, by the computing system, which traffic to insert between the computing systems to create an anomaly.

19. The computer-implemented method of claim 18, wherein the historical data comprises historical connection patterns between the plurality of computing systems.

\* \* \* \* \*